(12) United States Patent
Kassai et al.

(10) Patent No.: US 6,322,143 B2
(45) Date of Patent: Nov. 27, 2001

(54) VEHICULAR CHILD SAFETY SEAT (75) Inventors: Kenzou Kassai; Keiji Inoue, both of Osaka (JP)

(73) Assignee: Aprica Kassai Kabushikikaisha, Osaka (JP)

( * ) Notice: Subject to any disclaimer, the term of this patent is extended or adjusted under 35 U.S.C. 154(b) by 0 days.

(21) Appl. No.: 09/729,612

(22) Filed: Dec. 4, 2000

(51) Int. Cl.⁷ .................................................... B60N 2/28
(52) U.S. Cl. ..................................... 297/250.1; 297/256.1
(58) Field of Search ............................ 297/250.1, 256.1, 297/256.15

(56) References Cited

U.S. PATENT DOCUMENTS

| | | | |
|---|---|---|---|
| 4,653,809 | * | 3/1987 | Czernakowski et al. ..... 297/250.1 X |
| 5,507,558 | * | 4/1996 | Kain .............................. 297/250.1 X |
| 5,685,604 | * | 11/1997 | Kain .............................. 297/250.1 X |

* cited by examiner

*Primary Examiner*—Peter R. Brown
(74) *Attorney, Agent, or Firm*—W. F. Fasse; W. G. Fasse (57) ABSTRACT

A vehicular child safety seat comprises a waist belt engaging portion for deciding the vertical position of a waist belt provided on a movable member displaceable with respect to a base portion and locking means for restricting displacement of the movable member with respect to the base portion. The movable member is rendered rotatable about an axis X—X. A user can adjust the vertical position of the waist belt by rotating the movable member. The user can further fix the vertical position by changing the direction of a switch portion.

10 Claims, 6 Drawing Sheets

VEHICULAR CHILD SAFETY SEAT

BACKGROUND OF THE INVENTION

1. Field of the Invention

The present invention relates to a vehicular child safety seat placed on a seat of a car and fixed to the seat of the car with a waist belt included in a seat belt provided on the seat for holding a juvenile.

2. Description of the Prior Art

Following the recently increasing requirement for improvement in safety of automobiles, a vehicular child safety seat has been developed as an apparatus for attaining safety for a newborn, an infant, a child or a schoolchild (generically referred to as a juvenile) riding in a car.

Figure 8:
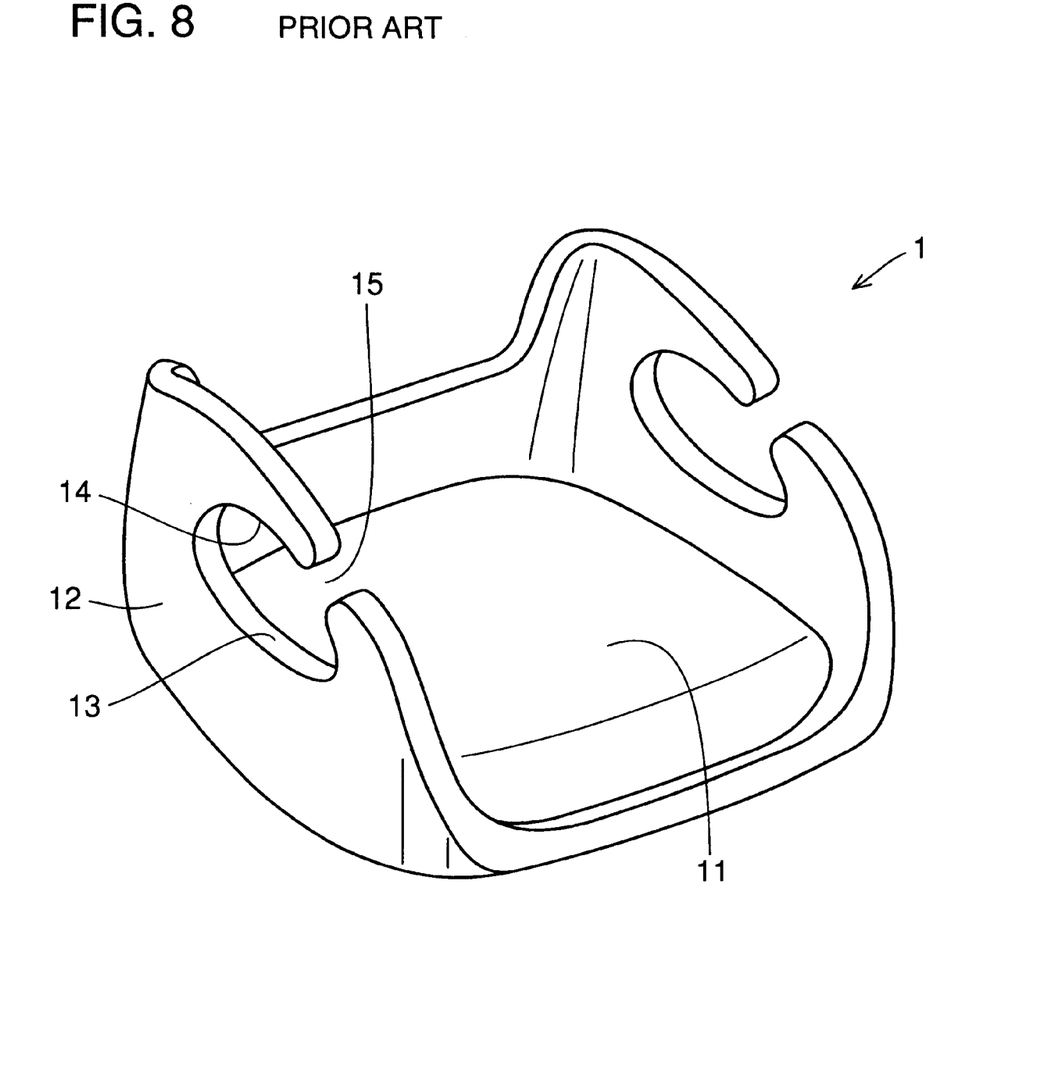
FIG. 8 is a perspective view of a vehicular child safety seat according to prior art.

FIG. 8 shows an example of a conventional vehicular child safety seat 1. The vehicular child safety seat 1 is employed for providing a high seat surface for a juvenile having a short trunk fastening a seat belt including a shoulder belt so that the shoulder belt does not hang on the face of the juvenile, and generally put on the market in the name of "booster". This type of vehicular child safety seat 1 is fixed to a seat (hereinafter referred to as "car seat") of a car with a waist belt included in the seat belt provided on the car.

The vehicular child safety seat 1 includes a seat surface 11 and side walls 12. Each side wall 12 has a waist belt engaging portion 13 and a shoulder belt engaging portion 14.

Figure 9:
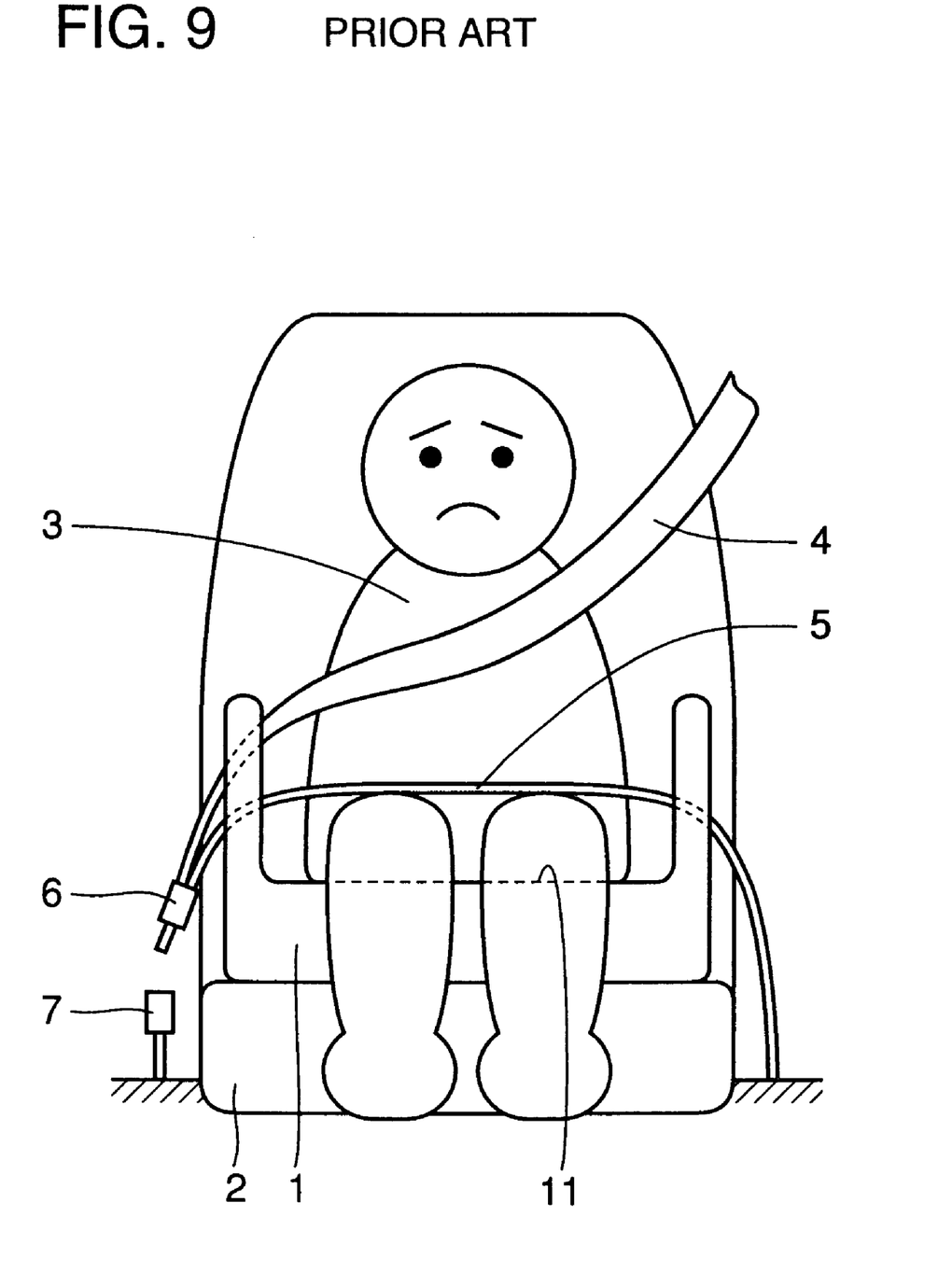
FIG. 9 is a front elevational view of the vehicular child safety seat according to the prior art attached to a car seat.

FIG. 9 shows the vehicular child safety seat 1 in use. The vehicular child safety seat 1 is placed on a car seat 2 for supporting a juvenile 3 from below with the seat surface 11. A waist belt 5 partially forming a seat belt provided on the car is extended over the vehicular child safety seat 1. The waist belt 5 is introduced into a notch of one of the side walls 12 through slits 15 and engaged with the waist belt engaging portion 13. A tongue plate 6 provided on the forward end of the waist belt 5 is connected with a buckle 7 for completely fastening the seat belt and simultaneously fixing the vehicular child safety seat 1 and the juvenile 3 to the car seat 2.

The shoulder belt 4 extending over the juvenile 3 obliquely from above is passed through one of the slits 15 and engaged with the shoulder belt engaging portion 14 provided on the side wall 12. The seat surface 11 of the vehicular child safety seat 1 is positioned higher than the seat surface of the car seat 2, and hence the shoulder belt 4 can be correctly extended over the shoulders of the juvenile 3 without hanging on the face of the juvenile 3 having a short trunk.

The size of the body of the juvenile 3 using the vehicular child safety seat 1 depends on the individual variation or the age of the juvenile 3. In the conventional vehicular child safety seat 1, however, the vertical position for extending the waist belt 5 is set constant in response to that of the waist belt engaging portion 13. The vertical position of the waist belt engaging portion 13 partially forming the fixed side wall 12 cannot be changed. When the juvenile 3 is of large build, therefore, the waist belt 5 may disadvantageously press the abdominal region.

SUMMARY OF THE INVENTION

The present invention has been proposed in order to solve the aforementioned problem, and an object thereof is to provide a vehicular child safety seat capable of changing the vertical position for extending a waist belt in response to the size of the body of a juvenile using the vehicular child safety seat.

In order to attain the aforementioned object, a vehicular child safety seat according to an aspect of the present invention, fixed to a seat of a car with a waist belt provided on the car for holding a juvenile, comprises a base portion supporting the juvenile from below, a waist belt engaging portion located on a side of the base portion to be displaceable along the vertical direction with respect to the base portion and a locking means fixing the vertical position of the waist belt engaging portion.

The waist belt engaging portion can be displaced and the vertical position thereof can be fixed by the locking means due to employment of the aforementioned structure, whereby the vertical position of the waist belt can be adjusted in response to the figure of the juvenile.

According to the present invention, the aforementioned waist belt engaging portion is preferably provided on a movable member provided to be displaceable with respect to the aforementioned base portion, and the aforementioned locking means fixes the aforementioned movable member with respect to the aforementioned base portion.

The vertical position of the waist belt engaging portion can be adjusted by displacing the movable member due to employment of the aforementioned structure, whereby the vehicular child safety seat is easy to handle.

According to the present invention, an engaging portion for engaging the aforementioned base portion and the aforementioned movable member with each other is preferably provided on at least one of the base portion and the aforementioned movable member stepwise along the vertical direction.

The vertical position of the movable member can be changed stepwise due to employment of the aforementioned structure, so that the vertical position of the waist belt engaging portion can also be changed stepwise.

According to the present invention, a projection provided on one of the aforementioned base portion and the aforementioned movable member can preferably be engaged with a receiving portion provided on the other one of the aforementioned base portion and the aforementioned movable member in the aforementioned engaging portion.

The projection may simply be engaged with the receiving portion for deciding the vertical position of the waist belt engaging portion due to employment of the aforementioned structure, whereby engagement is simplified.

According to the present invention, the aforementioned base portion preferably includes a toothed groove connecting a plurality of the aforementioned receiving portions with each other through a groove on a side surface, the aforementioned movable member includes the aforementioned projection, and the aforementioned projection is displaceable along the vertical direction and the horizontal direction with respect to the aforementioned toothed groove.

The vertical position of the waist belt engaging portion can be adjusted by moving the projection in the toothed groove due to employment of the aforementioned structure, whereby the vehicular child safety seat is easy to handle.

According to the present invention, the aforementioned movable member is preferably coupled to the aforementioned base portion through an axis to be rotatable.

The vertical position of the waist belt can be adjusted by rotating the movable member due to employment of the aforementioned structure, whereby the operation is simplified for readily adjusting the vertical position of the waist belt.

According to the present invention, the aforementioned locking preferably includes a rotatable switch portion coupled to the aforementioned base portion and a switch engaging portion provided on the aforementioned movable member and engageable with the switch portion, and when the aforementioned projection disengages from the aforementioned receiving portion due to horizontal displacement of the aforementioned movable member, the aforementioned switch engaging portion simultaneously engages with the aforementioned switch portion for restricting relative rotational motion of the aforementioned switch portion the aforementioned movable member for rendering the aforementioned movable member rotatable about the center of rotation of the aforementioned switch portion.

When the projection disengages from the receiving portion, the movable member is rotatable integrally with the switch portion due to employment of the aforementioned structure. When the projection engages with the receiving portion, the movable member not engaging with the switch portion is not rotatable but reliably fixed.

According to the present invention, horizontal displacement of the aforementioned movable member can preferably be restricted by changing the direction of the aforementioned switch portion in a state not engaged with the aforementioned switch engaging portion.

Displacement of the movable member is restricted not only in the rotational direction but also in the horizontal direction by changing the direction of the switch portion due to employment of the aforementioned structure, whereby reliable fixation can be attained. Thus, the vehicular child safety seat is safer for the juvenile using the same.

According to the present invention, the aforementioned movable member is preferably a plate-type member having a notch portion, and the aforementioned waist belt engaging portion is preferably provided inside the aforementioned notch portion.

The waist belt can be reliably engaged with the waist belt engaging portion due to employment of the aforementioned structure.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS (First Embodiment)

Figure 1:
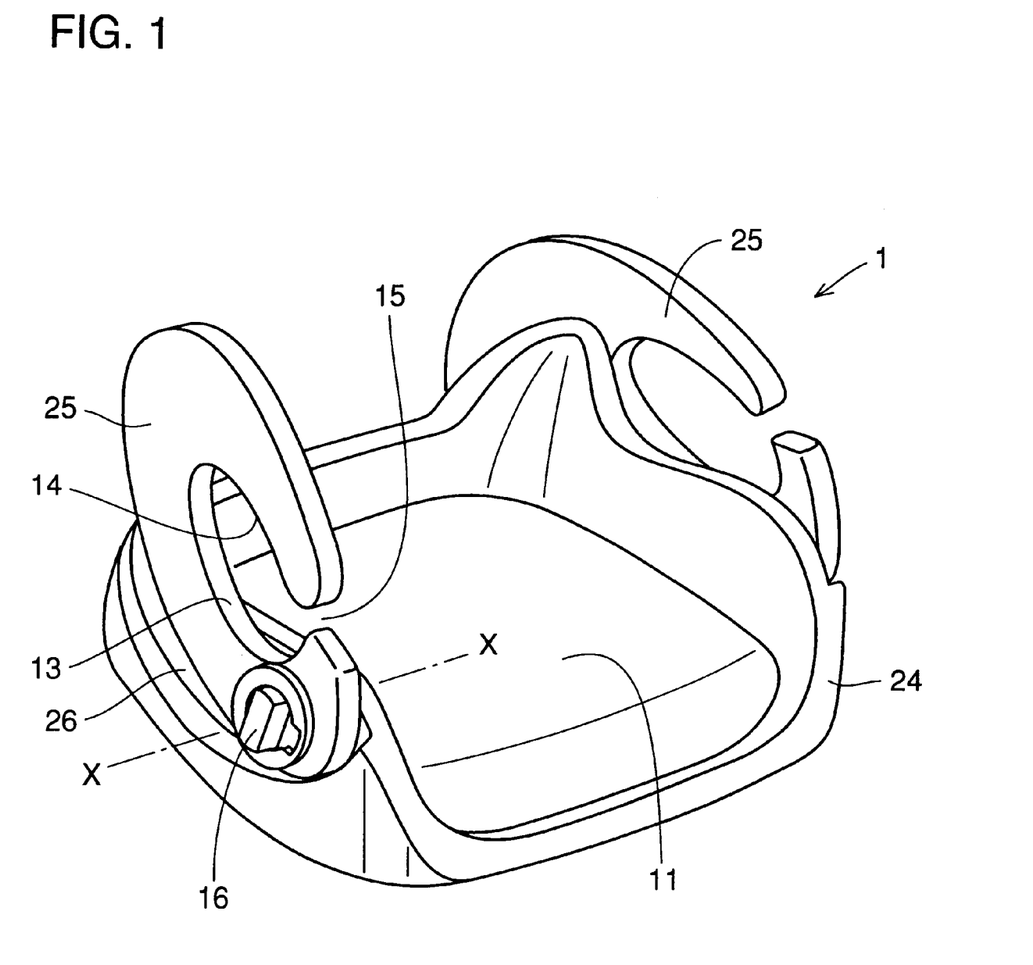
FIG. 1 is a perspective view of a vehicular child safety seat according to a first embodiment of the present invention.

FIG. 1 shows the structure of a vehicular child safety seat 1 according to a first embodiment of the present invention. The vehicular child safety seat 1 comprises a base portion 24 and movable members 25. The base portion 24 includes a seat surface 11 and base side surfaces 26. One movable member 25, having a waist belt engaging portion 13 and a shoulder belt engaging portion 14 is mounted to each base side surface 26 and rotatable about an axis X—X of rotation passing through the center of a switch and drive member 16 dissimilar to a conventional side wall 12 shown in FIG. 8. While FIG. 1 illustrates the movable member 25 positioned on the right side of a seated juvenile 3 (see FIG. 3) (hereinafter "right" and "left" stand for the right and left sides of the seated juvenile 3, unless otherwise stated) in detail, the vehicular child safety seat 1 according to this embodiment is horizontally symmetrical and the left movable member 25 is similarly rotatable. The movable members 25 provided on both sides are rotatable independently of each other. Referring to FIG. 1, the left movable member 25 is lowered while the right movable member 25 is raised.

Figure 2:
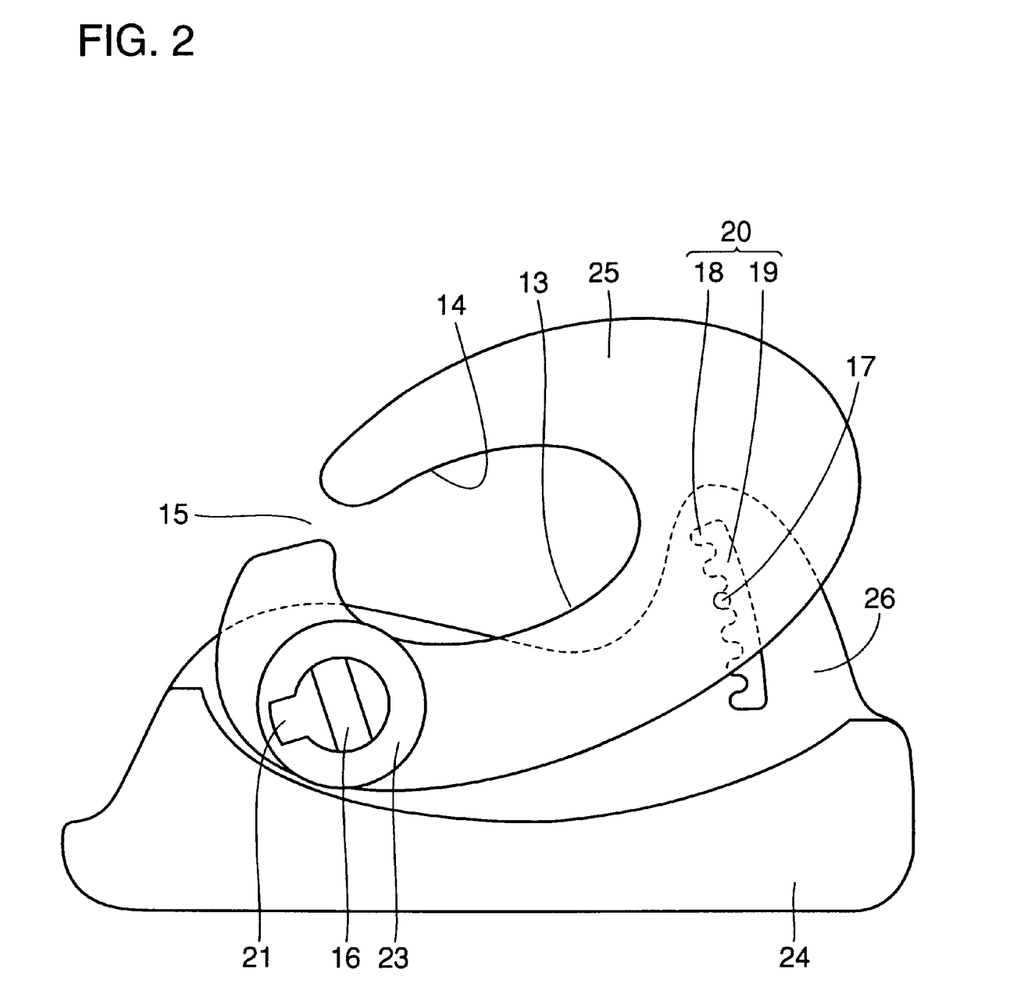
FIG. 2 is a side elevational view of the vehicular child safety seat according to the first embodiment of the present invention.

FIG. 2 illustrates a portion around the left movable member 25 as viewed from the left side surface. The movable member 25 includes a rotatable switch portion 16 and a switch portion ring 23 enclosing the same. The switch portion ring 23 is provided on its inner periphery with a concave switch engaging portion 21 having a shape engageable with the switch portion 16. As hereinabove described, the movable member 25 is rotatable about the center of rotation of the switch portion 16. The movable member 25 has a projection 17 on its rear surface. In the state shown in FIG. 2, the projection 17 engages with a concave portion 18 of a toothed groove 20 provided on the base side surface 26 thereby fixing the overall movable member 25 not to rotate. A method of adjusting the vertical position of a waist belt is described later.

A method of attaching the vehicular child safety seat 1 according to this embodiment to a seat of a car is now described.

Figure 3:
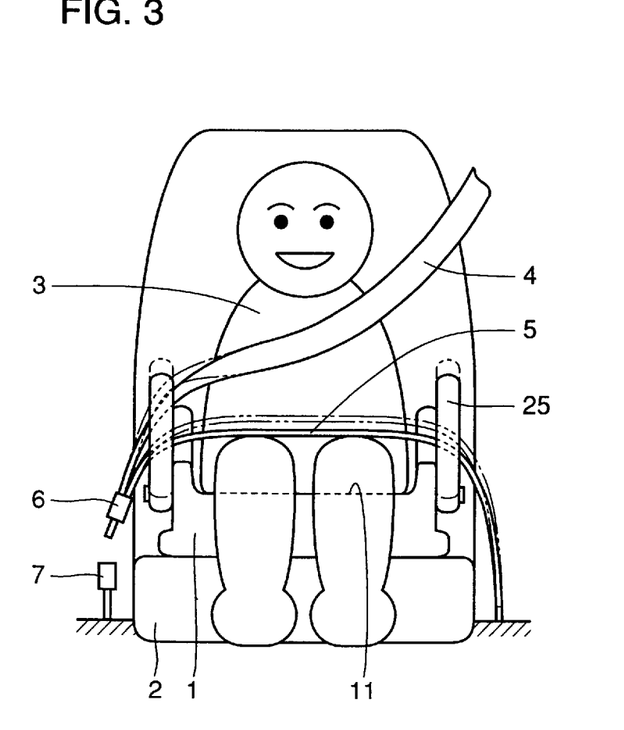
FIG. 3 is a front elevational view of the vehicular child safety seat according to the first embodiment of the present invention attached to a car seat.

FIG. 3 illustrates the vehicular child safety seat 1 attached to a car seat 2. The point that the vehicular child safety seat 1 is placed on the car seat 2 for supporting the seat surface 11 the juvenile 3 from below with the seat surface 11 and a method of extending a seat belt are in common with the conventional vehicular child safety seat 1 shown in FIG. 9.

The inventive vehicular child safety seat 1 is different from the conventional vehicular child safety seat 1 in a point that the vertical position of a waist belt 5 can be changed by displacing the movable member 25 in the vertical direction.

The method of adjusting the vertical position of the waist belt 5 is now described with reference to FIGS. 4 to 7. For convenience of illustration, FIGS. 4 to 7 show only the switch portion 16, the switch portion ring 23 and the projection 17 as to the movable member 25 and only the toothed groove 20 as to the base portion 24. The toothed groove 20 consists of receiving portions 18 and an arcuate groove 19. The switch portion ring 23 and the projection 17 are fixed to the movable member 25 respectively.

Figure 4:
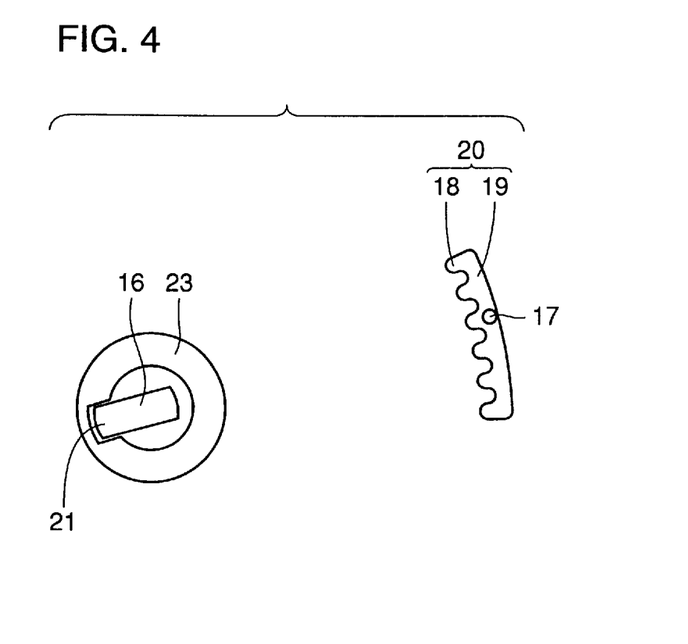
FIG. 4 is a first explanatory diagram for a method of adjusting the vertical position of a waist belt in relation to the vehicular child safety seat according to the first embodiment of the present invention.

FIG. 4 shows an unlocked state. In this state, the switch portion 16 engaging with the switch engaging portion 21 and the switch portion ring 23 are integrally rotatable about the axis X—X (perpendicular to the plane of the figure and hence not illustrated) of rotation passing through the center of the switch portion 16. Rotation of the switch portion 16 and the switch portion ring 23 means rotation of the movable member 25.

Figure 5:
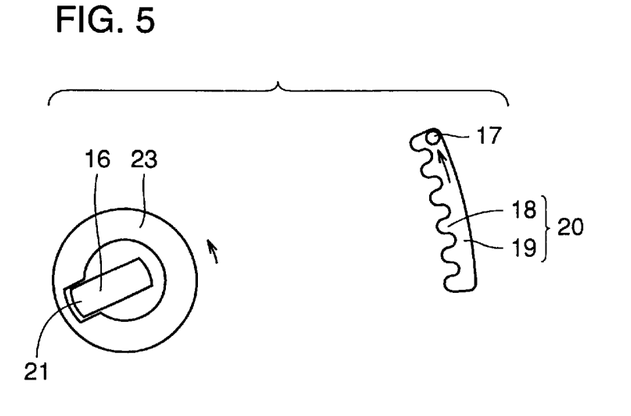
FIG. 5 is a second explanatory diagram for the method of adjusting the vertical position of the waist belt in relation to the vehicular child safety seat according to the first embodiment of the present invention.

FIG. 5 shows a state upon upward movement of the movable member 25. The projection 17 fixed to the movable member 25 moves on the arc following rotation of the movable member 25. The toothed groove 20 has a plurality of receiving portions 18 arranged stepwise along the groove 19. The movable member 25 is rotated until the projection 17 reaches a position corresponding to one of the projections 17 capable of implementing a desired vertical position of the waist belt 5.

Figure 6:
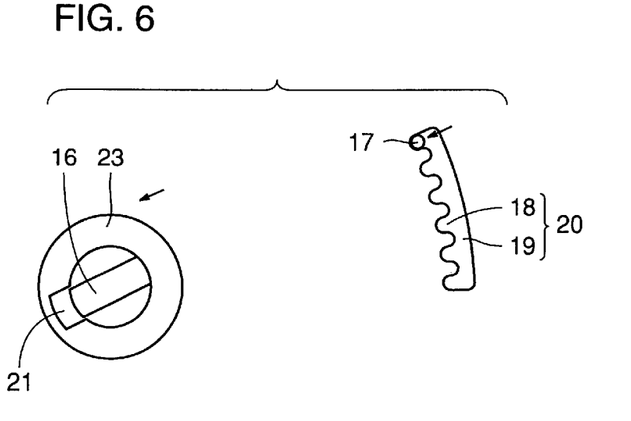
FIG. 6 is a third explanatory diagram for the method of adjusting the vertical position of the waist belt in relation to the vehicular child safety seat according to the first embodiment of the present invention.

FIG. 6 shows a state upon decision of the vertical position of the movable member 25. The movable member 25 is moved forward, i.e., leftward in FIG. 6, thereby engaging the projection 17 in the receiving portion 18 while simultaneously disengaging the switch portion 16 from the switch engaging portion 21. In this state, movement of the movable member 25 is restricted in the vertical direction but not completely restricted in the horizontal direction.

Figure 7:
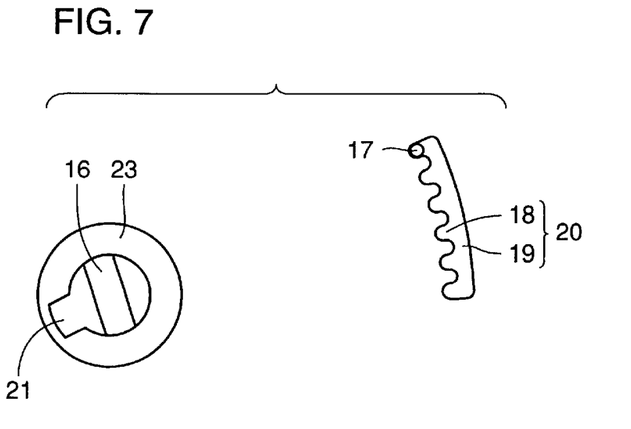
FIG. 7 is a fourth explanatory diagram for the method of adjusting the vertical position of the waist belt in relation to the vehicular child safety seat according to the first embodiment of the present invention.

FIG. 7 shows a state of fixing the position of the movable member 25 by changing the direction of the switch portion 16. Movement of the movable member 25 is restricted not only in the vertical direction but also in the horizontal direction due to provision of locking means fixing the same, so that the projection 17 can be kept engaged in the receiving portion 18.

In order to further change the vertical position of the waist belt 5, operations reverse to the above may be performed. The switch portion 16 may be rotated to be parallel to the switch engaging portion 21 for moving the movable member 25 backward (rightward in the figures) thereby disengaging the projection 17 from the receiving portion 18, thereafter rotating the movable member 25 for guiding the projection 17 to another receiving portion 18 similarly to the above and fixing the movable member 25 with the locking means.

As hereinabove described, the waist belt engaging portion 13 is provided on the movable member 25 provided on each side of the vehicular child safety seat 1 and the movable member 25 is coupled to the base portion 24 through an axis to be rotatable, whereby the vertical position of the waist belt engaging portion 13 can be changed by displacing the movable member 25. Therefore, the vertical position of the waist belt 5 can be changed. Consequently, it is possible to eliminate pressure on the abdominal part of the juvenile 3 whose figure is unfitted to the waist belt 5.

When changing the vertical position of the waist belt engaging portion 13 by rotating the movable member 25, the vertical position of the waist belt 5 can be changed stepwise through the receiving portions 18 provided stepwise, whereby the vertical position can be readily and reliably adjusted.

After rotating the movable member 25 for changing the vertical position of the waist belt 5, the result can be fixed with the locking means as shown in FIGS. 6 and 7, whereby safety can be attained.

The locking means, capable of restricting movement of the movable member 25 only by changing the direction of the switch portion 16, is easy to handle. Besides, the position of the movable member 25 remains unchanged against small impact or the like unless the direction of the switch portion 16 is changed again as shown in FIG. 6.

The locking means is not restricted to the aforementioned method but movement of the movable member 25 may alternatively be restricted by another means.

While the movable member 25 is displaced through rotation about the axis X—X in the aforementioned embodiment, the moveable member 25 may alternatively be displaced through sliding linearly.

While the receiving portions 18 are connected with each other through the groove 19 to form the toothed groove 20 in the aforementioned embodiment, the receiving portions 18 may alternatively be provided in another mode. For example, the receiving portions 18 may be formed by independent holes arranged on the base side surface 26 at prescribed intervals.

While the aforementioned embodiment employs engaging means formed by combining the projection 17 and the receiving portions 18 in the portion for engaging the movable member 25 with the base portion 24, another engaging means may alternatively be employed.

While the receiving portions 18 for deciding the position of the movable member 25 are provided stepwise in the aforementioned embodiment, a similar effect can be attained also when providing the receiving portions 18 stepless, except that the vertical position of the waist belt 5 is adjusted in a stepless manner in this case.

In the aforementioned embodiment, the combination of the projection 17 provided on the movable member 25 and the toothed groove 20 provided on the base side surface 26 is merely illustrative and may be reversely provided.

While the waist belt engaging portion 13 is provided on the movable member 25 in the aforementioned embodiment, the present invention is not necessarily restricted to this but the position of the waist belt engaging portion 13 may be set by another element.

According to the vehicular child safety seat of the present invention, the vertical position of the waist belt engaging portion can be readily changed by rotating the movable member about the axis. Further, the position of the movable member can be fixed by engaging the projection with the receiving portion located on a desired position and restricting the same with the locking means. Therefore, the vertical position of the waist belt can be adjusted in response to the figure of the juvenile, for eliminating pressure on the abdominal part of the juvenile generally applied by the waist belt.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A child safety chair adapted for attachment to a vehicle seat including at least one seat belt, said child safety chair comprising a base (24) with a seat (11) having a surface for seating a child, a first side section (26) positioned on one side of said base (24), a second side section (26) positioned on an opposite side of said base (24), a first seat belt positioning movable member (25) operatively secured to said first side section for assuming any one of a first plurality of different positions, a second seat belt positioning movable member (25) operatively secured to said second side section for assuming any one of a second plurality of different positions, each of said first and second seat belt positioning movable members comprising an engagement element (13) for engaging said at least one seat belt for vertically adjusting said at least one seat belt in accordance with different child sizes, a first locking mechanism (16) operatively connected to said first movable member (25) for locking said first movable member in any one of said first plurality of different positions and a second locking mechanism operatively connected to said second movable member for locking said second movable member in any one of said second plurality of different positions.

2. The child safety chair of claim 1, wherein each of said first and second locking mechanism comprises a mounting for rotatably securing a respective one of said first and second movable members (25) to a respective one of said first and second side sections of said child safety chair.

3. The child safety chair of claim 2, wherein each said mounting comprises a movable switch (16) and a switch engaging member (21) positioned for cooperation with said movable switch (16), so that a respective one of said first and second movable members (25) is movable into an adjusted position when said movable switch (16) engages said switch engaging member (21), and so that a respective one of said first and second movable members (25) is lockable in said adjusted position when said movable switch portion (16) is disengaged from said switch engaging member (21).

4. The child safety chair of claim 3, wherein each said first and second locking mechanism comprises a toothed member (20) defining a plurality of adjustment positions (18) for a respective one of said movable members (25) and a locking projection (17) for engaging said toothed member in any one of said plurality of adjustment positions.

5. The child safety chair of claim 4, wherein said locking projection (17) is secured to a respective one of said first and second movable members (25), and wherein said toothed member is a toothed groove (18, 19) secured to said base (24) or side section in a position for cooperation with said locking projection (17) to ride along said toothed groove into engagement with any one of said plurality of adjustment positions.

6. The child safety chair of claim 2, further comprising a support axis (X—X) secured to said first and second side sections (26) for rotatably mounting said first and second movable members (25), and wherein each of said first and second locking mechanisms includes a movable switch (16) positionable into alignment with said support axis for rotation about said support axis to thereby adjust a respective one of said first and second movable members (25) and wherein said movable switch (16) is further positionable out of alignment with said support axis for movement into a locking position in which said first and second movable members are locked into a fixed belt guiding position.

7. The child safety chair of claim 1, wherein each of said first and second locking mechanism comprises a linearly displaceable switch (16) operatively connected with a respective one of said first and second belt positioning movable members (25) for linearly displacing a respective one of said first and second movable members (25).

8. The child safety chair of claim 7, wherein a linear displacement of said movable belt positioning members (25) is restrictable by changing a motion direction of said linearly displaceable switch (16) when said switch (16) is free to move.

9. The child safety chair of claim 1, wherein each of said first and second seat belt positioning movable members is a plate having an opening through which said at least one seat belt is movable for lifting and lowering said at least one seat belt in response to an adjustment movement of any one of said first and second seat belt positioning movable members.

10. The child safety chair of claim 9, wherein said opening in said plate has a first edge for contacting said at least one seat belt formed as a waist seat belt, and a second edge for contacting a second seat belt formed as shoulder seat belt for adjusting a position of said shoulder belt.

* * * * *